US007893655B2

(12) United States Patent
Veselic

(10) Patent No.: US 7,893,655 B2
(45) Date of Patent: *Feb. 22, 2011

(54) CHARGING AND POWER SUPPLY FOR MOBILE DEVICES

(75) Inventor: Dusan Veselic, Oakville (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/716,535

(22) Filed: Mar. 3, 2010

(65) Prior Publication Data

US 2010/0156179 A1    Jun. 24, 2010

Related U.S. Application Data

(63) Continuation of application No. 11/299,701, filed on Dec. 13, 2005, now Pat. No. 7,701,173.

(51) Int. Cl.
*H02J 7/00* (2006.01)
(52) U.S. Cl. ................... 320/128; 320/112; 320/114
(58) Field of Classification Search ............. 320/128, 320/112, 114
See application file for complete search history.

(56) References Cited

U.S. PATENT DOCUMENTS

| 5,179,335 | A |   | 1/1993  | Nor |
|-----------|---|---|---------|-----|
| 5,432,427 | A |   | 7/1995  | Chiang |
| 5,694,022 | A |   | 12/1997 | Ranta et al. |
| 5,939,862 | A | * | 8/1999  | Kates et al. ................. 320/125 |
| 6,031,359 | A |   | 2/2000  | Michelsen et al. |
| 6,100,664 | A |   | 8/2000  | Oglesbee et al. |
| 6,118,254 | A |   | 9/2000  | Faulk |
| 6,188,199 | B1 |  | 2/2001  | Beutler et al. |
| 6,222,347 | B1 |  | 4/2001  | Gong |
| 6,300,744 | B1 |  | 10/2001 | Shum |
| 6,741,066 | B1 | * | 5/2004  | Densham et al. ............ 320/145 |

(Continued)

FOREIGN PATENT DOCUMENTS

EP    0623985 A    11/1994

(Continued)

OTHER PUBLICATIONS

Extended European Search Report issued in respect of EP Patent Application No. 05112066.5.

(Continued)

*Primary Examiner*—Edward Tso
*Assistant Examiner*—Samuel Berhanu
(74) *Attorney, Agent, or Firm*—Ridout & Maybee LLP

(57) ABSTRACT

Charging and power supply for mobile devices is disclosed. A USB-compliant charging and power supply circuit includes switch-mode battery charging circuitry for receiving power from an external power source and for supplying output power through an output node to an electronic system of an electronic communication device and a battery. Battery isolation circuitry includes a semiconductor switch connecting the output node to the battery. The battery isolation circuitry senses voltage at the output node and variably restricts current to the battery when the voltage is below a minimum voltage value by operationally controlling the semiconductor switch as current passes through it. During variable current restriction the electronic system is supplied required power with said battery being supplied any additional available power.

11 Claims, 4 Drawing Sheets

U.S. PATENT DOCUMENTS

| | | |
|---|---|---|
| 7,208,892 B2 | 4/2007 | Tondra et al. |
| 2004/0164707 A1 | 8/2004 | Veselic et al. |
| 2004/0164708 A1 | 8/2004 | Veselic et al. |
| 2004/0239294 A1 | 12/2004 | Veselic et al. |
| 2004/0251878 A1 | 12/2004 | Veselic et al. |
| 2005/0046391 A1 | 3/2005 | Veselic et al. |
| 2006/0022640 A1 | 2/2006 | Frith et al. |

FOREIGN PATENT DOCUMENTS

| | | |
|---|---|---|
| EP | 0752748 A | 1/1997 |
| JP | 2003-32910 | 1/2003 |
| WO | 2004075371 A | 9/2004 |

OTHER PUBLICATIONS

International Search Report issued on Mar. 21, 2007 in respect of PCT/CA2006/002025.

Digitally Programmable 1A Switch-Mode USB/AC Li-Ion Charger IC Sets Records for Charge Time, Power Dissipation and Size, published Feb. 21, 2006, http://www.summitmicro.com/comp_info/press/022106/pr022106.htm.

Charging Batteries from USB, published Aug. 25, 2006, http://www.maxim-ic.com/appnotes.cfm/appnote_number/3607.

Texas Instruments, "Synchronous Switchmode, Li-Ion and Li-Pol Charge Management IC with Integrated Powerfets (bqSWITCHER)", Nov. 2004.

Texas Instruments, Single-Chip, Li-Ion and Li-Pol Charger IC with Autonomous USB-Port and AC-Adapter Supply Management (bqTINY—II), Aug. 2004.

Texas Instruments, "High-Effciency Step-Down Low Power DC-DC Converter", Sep. 2003.

* cited by examiner

CHARGING AND POWER SUPPLY FOR MOBILE DEVICES

CROSS-REFERENCE TO RELATED APPLICATIONS

The present application is a continuation of U.S. patent application Ser. No. 11/299,701, filed Dec. 13, 2005, the contents of which are hereby incorporated herein by reference.

FIELD

Charging and power supply circuits for mobile devices.

BACKGROUND

As will be appreciated by those skilled in the art, there are various reasons for choosing a Universal Serial Bus (USB) port to supply charging power to a mobile device, rather than using a separate alternating current (AC) charger. Unfortunately, USB ports can only provide limited power.

Power rails of mobile devices often require a very clean supply voltage. Thus, Low Drop-Out (linear mode) circuits have been used to meet this requirement. A problem with these circuits is that they can be quite inefficient power converters.

BRIEF DESCRIPTION OF THE DRAWINGS

Reference will now be made, by way of example, to the accompanying drawings which show example embodiments, and in which.

Similar reference numerals may have been used in different figures to denote similar components.

DESCRIPTION OF EXAMPLE EMBODIMENTS

According to one example embodiment, there is a USB-compliant charging and power supply circuit including switch-mode battery charging circuitry for receiving power from an external power source and for supplying output power through an output node to an electronic system of an electronic communication device and a battery. Battery isolation circuitry includes a semiconductor switch connecting the output node to the battery. The battery isolation circuitry senses voltage at the output node and variably restricts current to the battery when the voltage is below a minimum voltage value by operationally controlling the semiconductor switch as current passes through it. During variable current restriction the electronic system is supplied required power with the battery being supplied any additional available power.

According to another example embodiment, there is an electronic communication device electrically connectable to an external power source. The device includes a device housing and a rechargeable battery contained within the housing. An electronic system is contained within the housing. Switch-mode battery charging circuitry receives power from an external power source and supplies output power through an output node to the electronic system and the battery. Battery isolation circuitry includes a semiconductor switch connecting the output node to the battery. The battery isolation circuitry senses voltage at the output node and variably restricts current to the battery when the voltage is below a minimum voltage value by operationally controlling the semiconductor switch as current passes through it. During variable current restriction the electronic system is supplied required power with the battery being supplied any additional available power.

According to yet another example embodiment, there is a power management method for allocating power between a rechargeable battery and an electronic system having a power input and a number of modes of operation. The power is supplied to the battery and the electronic system from a requisite power source. The method includes generating the requisite power source and determining a minimum voltage needed at a node directly connected to the power input with reference to which of the modes of operation the electronic system is currently in. The method also includes monitoring voltage at the node and increasing power allocation to the electronic system by variably restricting current from the requisite power source to the battery when the voltage is below the minimum voltage. The method also includes supplying at least sufficient power to the electronic system for it to properly function.

Figure 1:
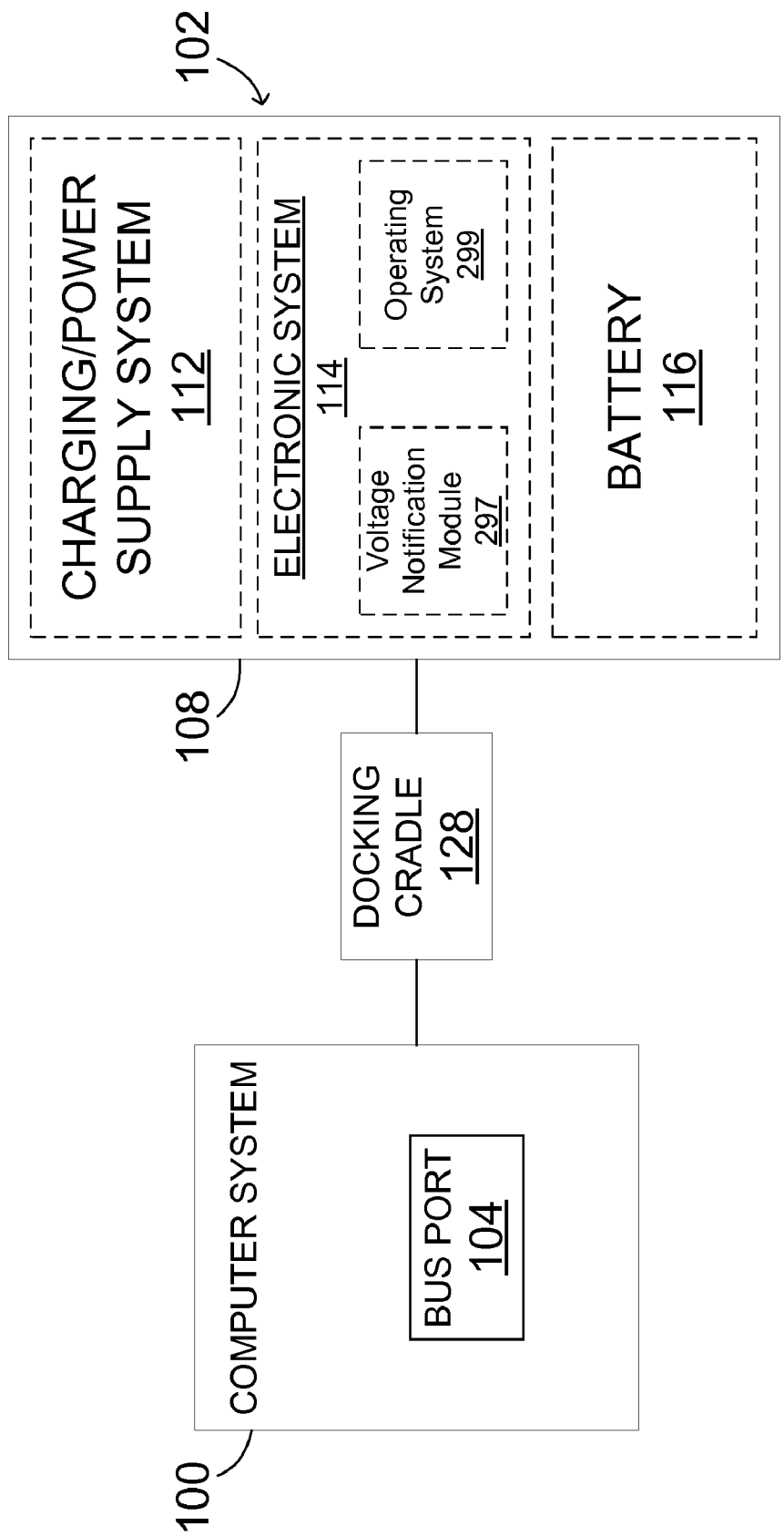
FIG. 1 shows, in diagrammatic form, a computer system connected to a mobile device via a USB port.

FIG. 1 is a diagram of a computer system 100 connected to a mobile device 102 via a computer data bus port 104 that in one embodiment is a USB port. The computer system 100 could be a personal computer, a laptop, an entertainment system connected to a television, or one of a variety of other types of computer systems. In some example embodiments, the portable device 102 is a handheld device such as a personal digital assistant (PDA), a cellular telephone, or a handheld computer; however at least some example embodiments are not limited to these types of mobile devices.

The portable device 102 includes a portable device housing 108, a charging and power supply circuit 112, an electronic system 114, a rechargeable battery 116 and a number of other modules/components which are not illustrated because they do not further an understanding of what is herein being described. The device housing 108 will vary in shape and size depending upon the particular portable device 102.

The rechargeable battery 116 is one of the components illustrated within the device housing 108. In one embodiment, the rechargeable battery 116 is a Li-ion battery. Nickel metal hydride and nickel-cadmium are other well known types of rechargeable batteries, but practically speaking these types of rechargeable batteries have to a large degree been succeeded in mobile devices by Li-ion batteries. It will be understood that the rechargeable battery 116 need not necessarily be a single battery, but could instead be multiple batteries sourcing power in series, parallel or a combination of these. In one embodiment, the rechargeable battery 116 is a battery pack.

In the illustrated embodiment, the portable device 102 connects to the USB port 104 of computer system 100 through a docking cradle 128 that is adapted to receive the portable device 102. It will be understood that the portable device 102 could alternatively be connectable to the bus port 104 by just using a direct cable connection to make the attachment; however having a docking cradle can be practical. For example, the portable device 102 need only be set down in the docking cradle 128 to make an electronic connection to the computer system 100. In at least one alternative embodiment, at least a portion of the charging and power supply circuit 112 is contained in the docking cradle 128.

Figure 2:
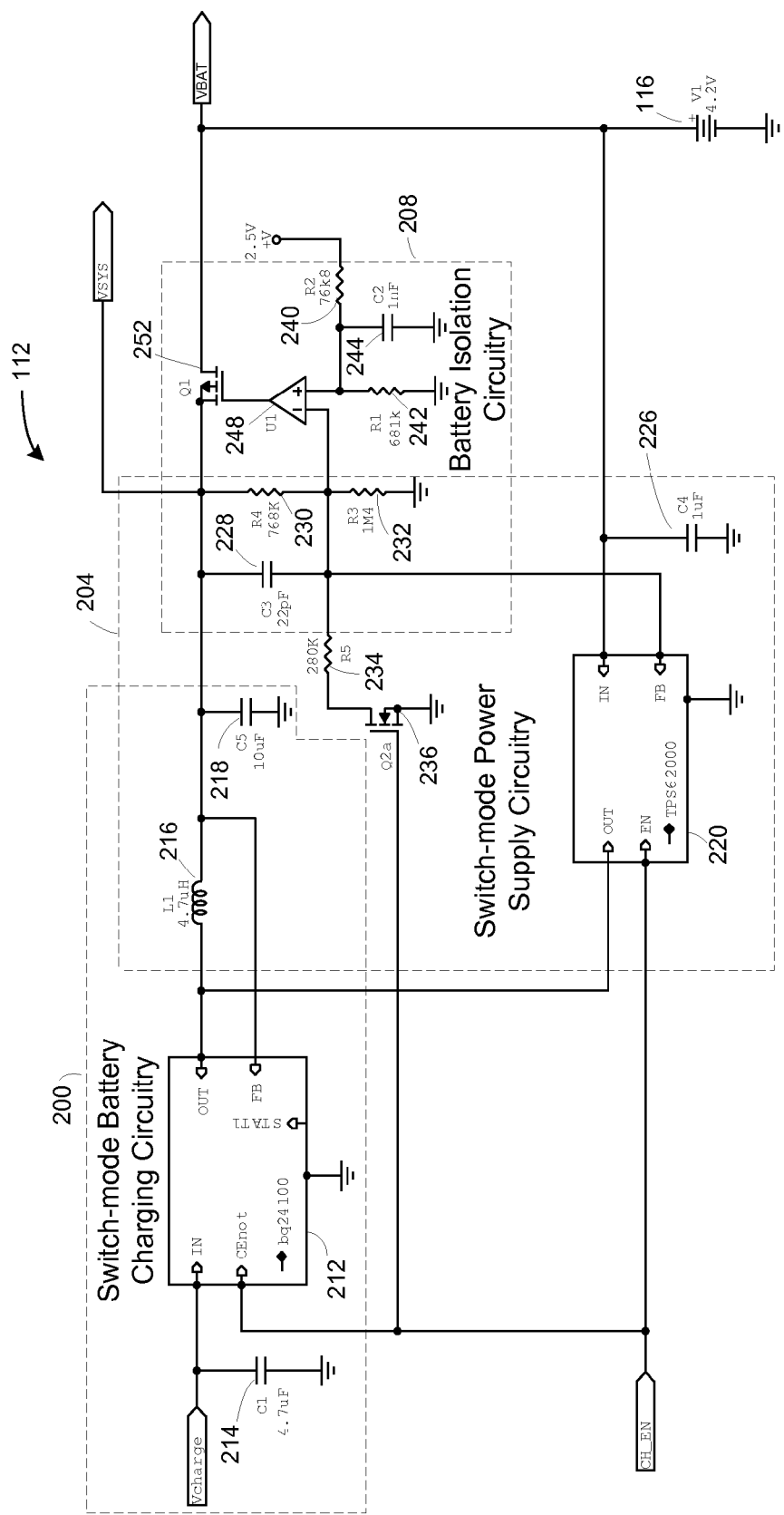
FIG. 2 is a circuit schematic representation of a charging and power supply circuit architecture according to an example embodiment.

If the bus port 104 has sufficient power, it can be used to supply charging power to charge the battery 116. FIG. 2 illustrates an architecture of the charging and power supply circuit 112 in accordance with an example embodiment. The circuit architecture includes switch-mode battery charging circuitry 200 that receives power from the external power source, system power supply circuitry 204 and battery isolation (and current split) circuitry 208. The circuit 112 is electrically connected at one of its output terminals ($V_{BAT}$) to the rechargeable battery 116, and at another of its output terminals ($V_{SYS}$) to a power source input of the electronic system 114. External power (i.e. power originating from outside of the portable device 102, for example at USB port 104) is sourced through an input terminal ($V_{CHARGE}$) of the circuit 112.

The circuitry 200 and the circuitry 204 are switch-mode circuitries. As will be appreciated by those skilled in the art, at least some examples of switch-mode circuitries are characterized by a high-pass power FET and a low-pass power FET (the two FETs are collectively referred to as a half-bridge) that are connected at a terminal of an inductor (in the present example, inductor 216) that is employed to build up current.

The difference between switch-mode circuitry and linear mode circuitry will also be appreciated by those skilled in the art. Switch-mode circuitry is capable of providing a greater output current than the input current. For example, say $V_{CHARGE}$ is 8.4 Volts and the input current to the switch-mode battery circuitry 200 is 100 mA. Now if the voltage at the output of the circuitry 200 is to be less than the $V_{CHARGE}$, the output current can theoretically be greater than 100 mA ($V_{in}*I_{in}$ is$\geq V_{out}*I_{out}$). So for example, if the voltage at the output of the circuitry 200 were to be 4.2 V, the output current from the circuitry 200 could be, for example, 150 mA or greater.

By contrast, linear mode circuitry is not capable of providing a greater output current than the input current. So again with reference to the above mentioned example, if the input voltage to linear mode circuitry was 8.4 V, and the output voltage from the linear mode circuitry were to be 4.2 Volts, there would be only 50% efficiency. In other words, 50% of the input power to the linear mode circuitry in this example would be dissipated as heat. An effect of lower efficiency within a circuit similar to the example circuit 112 is that less power is available to the electronic system (and also the battery in the case of charging). One skilled in the art will appreciate that certain electronic systems (for example certain handheld systems) increasingly need more power to function.

In the illustrated example embodiment, the switch-mode battery charging circuitry 200 includes a Li-ion and Li-polymer switch-mode charge management integrated circuit (IC) 212 such as part number bq24105 or bq24115 available from Texas Instruments. As will be appreciated by one skilled in the art, the IC 212 is used in applications such as Li-ion battery (e.g. battery pack) charging. The IC 212 has a typical switching frequency of 1.1 MHz and also the IC 212 charges the battery in three phases: conditioning, constant current and constant voltage. The first phase, the conditioning phase, applies if the voltage value of the battery 116 is below a certain threshold (for example, if the battery voltage is below between 68% and 75% of the fully charged voltage of the battery 116 depending upon the operating conditions of the IC 212). During this phase a precharge current is applied to the battery 116 to revive it if it has been deeply discharged. Otherwise, charging begins in the constant current phase during which the current sourced from the IC 212 is substantially a constant value. This phase continues until the IC 212 detects that the battery 116 has been brought to its fully charged voltage value. (Battery voltage can be monitored indirectly through a BAT pin (not shown) of the IC 212). More specifically, one skilled in the art will appreciate that, in some examples, the electronic system 114 is able to monitor the value of $V_{BAT}$. Based on monitored values, the system 114 generates appropriate signals that are transmitted through processor control lines to the IC 212).

When the battery 116 has been brought to its fully charged voltage value, charging enters the final phase, the constant voltage phase. During the constant voltage phase, the battery 116 is substantially maintained at the fully charged battery voltage value, with sourced current tapering off during this phase. Charge is terminated based on a user-selectable minimum current level. This current level is selected by the value of a programming resistor connected to the $I_{SET2}$ pin (not shown) of the IC 212.

The switch-mode battery charging circuitry 200 also includes a capacitor 214, an inductor 216, and a capacitor 218, which in an example embodiment can have the values 4.7 µF, 4.7 µH and 10 µF respectively (other values can also be used). It will be understood that with a supply voltage being supplied to the input (IN) pin of the IC 212 through terminal $V_{CHARGE}$, the capacitor 214 filters the supply voltage (the capacitor 214 reduces interference). The inductor 216 has one of its terminals connected to the output (OUT) pin of the IC 212, and its other terminal is connected to terminals of other components including the feedback (FB) pin of the IC 212 and a terminal of the capacitor 218. The IC 212 is manufactured with the FB pin in order to provide for output voltage analog feedback adjustment. In the illustrated embodiment, the FB pin connection is such that the output node of the circuitry 200 (the $V_{SYS}$ node) is also the node of the FB pin, and the connection establishes a feedback means of the switch-mode battery charging circuitry 200 for adjusting a voltage value output to the electronic system 114 (FIG. 1).

With reference now to the illustrated system power supply circuitry 204, this circuitry includes switch-mode power supply (SMPS) circuitry. This SMPS circuitry includes a low power, switch-mode DC-DC converter IC 220. A suitable IC 220 is the TPS62000 (TPS6200x) IC available from Texas Instruments. The TPS62000 IC is a current-mode pulse-width modulation (PWM) converter and is suitable for systems such as those powered by a one-cell Li-ion battery. The IC 220 is manufactured with an FB pin in order to provide for output voltage analog feedback adjustment. This FB pin operates in a manner similar to the FB pin of the IC 212. The IC 220 typically operates down to an input voltage of 1.8 Volts, and it enters a power-saving pulse-frequency modulation (PFM) mode at light load currents. The IC 220 has a typical switching frequency of 750 KHz, permitting the use of the relatively small inductor 216.

Like the IC 212, the IC 220 can run at a high efficiency because they are both switch-mode. Thus the IC 220 also contains a half-bridge, and the half-bridge is directly connected to the inductor 216 (employed to build up current) Like the switch-mode battery charging circuitry 200, the system power supply circuitry 204 is capable of providing a greater output current than the input current.

Li-ion battery 116 is connected to the input (IN) pin of the IC 220 because the IC 220 receives power from it. In one embodiment, the battery 116 provides an input voltage of about 4.2 Volts when the battery is fully charged. It will be understood however that the embodiments disclosed in this application are not limited just to portable devices that use batteries whose voltages are roughly 4.2 Volts.

A capacitor 226 has one terminal connected to the IN pin of the IC 220. This capacitor filters the input voltage and reduces interference. In one embodiment, the capacitor 226 can be about 1 µF.

Like the IC 212, the output (OUT) pin of the IC 220 is connected to a terminal of the inductor 216 (in the illustrated embodiment the inductor 216 is within both the switch-mode battery charging circuitry 200 and the system power supply circuitry 204). The IC 220 supplies converted power to the electronic system 114 (FIG. 1) by way of the inductor 216 and then through the output node of the circuitry 200.

A terminal of the inductor 216 (the terminal opposite the terminal connected to the OUT pins of ICs 212 and 220) is connected to a capacitor 228 and a resistor 230 that are in parallel. As will be understood by those skilled in the art, the capacitor 228 permits a much faster feedback response when transient spikes occur. Illustrated below the resistor 230 is a resistor 232 in parallel with the series combination of a resistor 234 and an n-channel enhancement field effect transistor (FET) 236.

In the illustrated battery isolation circuitry 208, a resistor 240, a resistor 242, and a capacitor 244 having example values of 76.8 kΩ, 681 kΩ and 1 nF respectively, each have a terminal connected to the non-inverting terminal of an operational amplifier (op-amp) 248. The output of the op-amp 248 is connected to the gate of a p-channel enhancement FET 252. The capacitor 244 filters out the output voltage ripple. The resistors 240 and 242 act as a voltage divider of the example 2.5V voltage source so that the voltage at the non-inverting terminal of the op-amp 248 is 2.25V. As will be appreciated by those skilled in the art, varying the voltage at the non-inverting terminal will impact the behavior of the op-amp 248. For example, the output of the op-amp 248 will move within the range of ground and its $V_{CC}$ in order to keep the inverted and non-inverted inputs at the same voltage potential.

It will be understood that when the FET 236 is off, the voltage at the $V_{SYS}$ node is calculated as some adjustable value (which is dependent upon the voltage at the non-inverting input terminal of the op-amp 248) multiplied by 1 plus the value of the resistor 230 divided by the value of the resistor 232. It will also be understood that the formula is different when the FET 236 is in saturation: the voltage at the $V_{SYS}$ node will go up in the adjusted formula because the resistor 234 and the resistor 232 in parallel form a lower resistance than the resistor 232 by itself.

In the illustrated example embodiment, the relationship between $I_{BATTERY}$ (the current passing through node $V_{BAT}$), $I_{CHARGE}$ (the current passing through node $V_{CHARGE}$), and $I_{SYS}$ (the current passing through node $I_{SYS}$) is $I_{BATTERY} = I_{CHARGE} - I_{SYS}$. Based on this relationship and assuming a fixed $I_{CHARGE}$, it will be understood that $I_{SYS}$ must be decreased for $I_{BATTERY}$ to increase. It will also be understood that $I_{CHARGE}$ could be limited in the case where the current is being supplied from a computer bus port such as a USB port. Therefore in the case where the battery 116 is substantially discharged (e.g. at say 2.3 Volts) and the battery 116 is to be charged by bus port charging, it will be understood that the system could be starved if current to the substantially discharged battery is not regulated.

At the interface between the switch-mode battery charging circuitry 200 and the battery 116, the FET 252 provides this regulation. The FET 252 functions as a semiconductor switch between nodes $V_{SYS}$ and $V_{BAT}$. As one skilled in the art will appreciate, the FET 252 can be made to act in a manner somewhat similar to a variable resistor when the voltages on its terminals correspond to operation in the triode region of the FET. In FIG. 2, the behavior of the FET 252 is controlled in part by the op-amp 248, the output of which is in turn determined in part by the resistors 230 and 232.

The circuitry 208 works against $V_{SYS}$ falling below a certain voltage. The battery isolation circuitry 208 does this by operationally controlling the FET 252. In particular, at times when the voltage of the battery 116 is low enough to urge $V_{SYS}$ below the minimum voltage, the configuration of the battery isolation circuitry 208 causes the FET 252 to present a variable resistance to limit $I_{BATTERY}$ as will be apparent to those skilled in the art. Thus, it will be understood that the circuitry 208 monitors $V_{SYS}$ in order that the FET 252 can limit $I_{BATTERY}$ to keep $V_{SYS}$ from falling too low. For the circuit architecture of the illustrated example, the minimum $V_{SYS}$ during charging is the voltage at the non-inverting input terminal of the op-amp 248 divided by the value of (resistor 232÷(resistor 232+resistor 230)).

It will be understood that an effect of the circuitry 208 working against $V_{SYS}$ falling below a minimum value is to make the example circuit 112 USB-compliant. Those skilled in the art will appreciate that in at least some examples of USB at least the following lines exist: $D^+$, $D^-$, $V_{BUS}$, GND. Referring to FIG. 1, during setup between the computer system 100 and the electronic system 114, the system 114, in at least some examples, has to make $D^+$ go from low to high at 100 ms.

In order for the electronic system 114 to do this, the electronic system 114 needs to be able to talk over USB in less than 100 ms. The example circuit 112 can permit this even when the battery 116 has a voltage that is significantly lower than the minimum value for $V_{SYS}$. This is because the circuitry 208 ensures that $V_{SYS}$ is (without significant delay) brought to a high enough value to permit the electronic system 114 to talk over USB. As a result, the example circuit 112 is USB-compliant.

The FET 252 will variably restrict current to the battery 116 to ensure that the electronic system has the requisite power source. As for the battery 116, it is supplied any additional available power (i.e. the leftover portion of the output power from the switch-mode battery charging circuitry 200). However, if $V_{SYS}$ is not urged by the battery 116 to fall below the minimum voltage because $V_{BAT}$ is sufficiently high, the FET 252 will be in full saturation if the battery 116 is being charged. The FET 252 can be turned off if the CH_EN signal, which is also fed to the CEnot pin of the IC 212 and the EN pin of the IC 220, is set to high, which causes the FET 236 to saturate, thereby creating a positive output from the op-amp 248 which shuts the FET 252 off. Thus, the charging and power supply circuit can include circuitry for turning the FET 252 off when charging is disabled.

Figure 3:
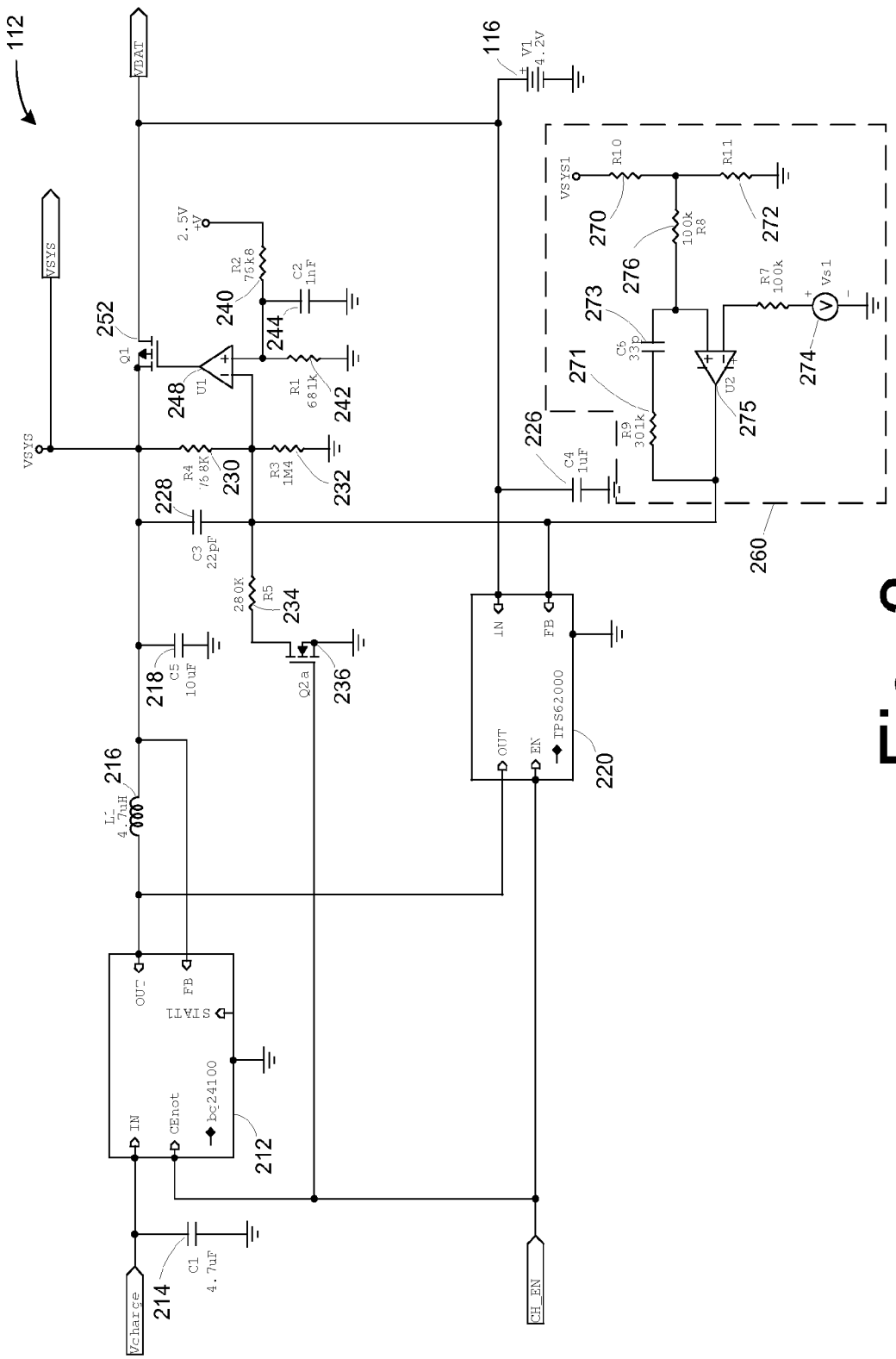
FIG. 3 is a circuit schematic representation illustrating additional circuitry connected to the circuit depicted in FIG. 2, the additional circuitry permitting variable $V_{SYS}$ output voltage.

Referring to FIG. 3, a circuit architecture similar to the one of FIG. 2 is illustrated, except that the circuit of this schematic includes additional circuitry 260 permitting variable $V_{SYS}$ output voltage. In the circuitry 260, the terminal at $V_{SYS}$ is connected to the $V_{SYS}$ node, and resistors 270 and 272 provide a voltage divider to scale down the voltage at the positive input terminal of op-amp 275 through resistor 276 from the $V_{SYS}$ voltage. The values of the resistors 270 and 272 will depend on the maximum voltage of the variable voltage source 274 as compared to the maximum $V_{SYS}$. For example, if the voltage source 274 will provide up to a maximum voltage that is four times less than the maximum $V_{SYS}$, then the resistor 270 should be three times larger than the resistor 272. When the circuitry 260 is added (and the terminal at $V_{SYS}$ is connected to the $V_{SYS}$ node) $V_{SYS}$ is related to the voltage provided by the voltage source 274 by the following formula: $V_{SYS}$=voltage source 274\*(resistor 272+resistor 270)/resistor 272. (In one example where the voltage source 274 can be raised to the maximum $V_{SYS}$, the voltage divider will be absent from the circuitry 260 and $V_{SYS}$ will be equal to the voltage source 274).

The voltage source 274 is, in some examples, provided by the electronic system 114 (as later explained in this description). A resistor 271 and a capacitor 273 having example values of 301 KΩ and 33 pF respectively are connected in series between an output terminal and a non-inverting input terminal of the op-amp 275. The resistor 271 and the capacitor 273 provide positive feedback for the operation of the op-amp 275.

The illustrated configuration could, in some applications, allow for flexible and increased power gain. For example, a handheld device might need different values for $V_{SYS}$ during different periods of operation. During one period when a handheld device is in sleep mode the required $V_{SYS}$ could be significantly lower than during another period when the handheld device needs to supply power to modules and subsystems required for the processing of communications. Output from the op-amp 275 of the circuitry 260 (as controlled by the voltage source 274) effects feedback input provided to the ICs 212 and 220, and in this manner dynamic variation of the voltage value at the $V_{SYS}$ node is possible. For example, in the circuit architecture of FIG. 2, when the SMPS circuitry is supplying the power (i.e. no charging) the voltage at the $V_{SYS}$ node is calculated as 0.45 V\*(1+(resistor 230/resistor 232| resistor 234)). (This formula is known to those familiar with the operation of the IC 220). In the circuit architecture of FIG. 3, the output node of the additional circuitry 260 is directly connected to the node between the resistor 230 and the resistors 232 and 234 that are in parallel. In this manner the output of the circuitry 260 can be seen to override the resistor-value-based determination of the voltage at the $V_{SYS}$ node. In particular, when the circuitry 260 is active, the resistors 230, 232 and 234 become irrelevant in the determination of the $V_{SYS}$ node voltage, and the voltage at the $V_{SYS}$ node can be dictated by suitable increasing or decreasing of the voltage of the variable voltage source 274 in accordance with the formula $V_{SYS}$=voltage source 274\*(resistor 272+resistor 270)/ resistor 272.

In some examples, the microprocessor of the device will change the voltage provided by the voltage source 274 when the device enters a mode corresponding to a different required $V_{SYS}$. For example (as shown in FIG. 1) the portable device 102 could include a voltage notification module 297 interacting with an operating system 299 stored on the device 102. In such examples, the operating system 299 might periodically provide the voltage notification module 297 with the current mode of operation of the device 102 in order that the voltage notification module 297 might take action if required. Such action could include the generation of an appropriate voltage at a pin of the device's microprocessor which would provide the voltage source 274 within the circuitry 260.

In some examples, the microprocessor of the device 102 would be configured to implement the voltage notification module 297. In other examples, some or part of the functionality of the voltage notification module 297 would be implemented through firmware or hardware components instead of or in combination with computer software instructions executed by a processor of the device 102.

In at least one example embodiment where there is dynamic variation of $V_{SYS}$ in relation to requirements of the electronic system 114, the value of variable $V_{SYS}$ is dictated by the highest power rail during a particular period (e.g. mode) of operation. The following example scenario illustrates this concept. During sleep mode for an example device, the device's microprocessor might only require a 1.1 V power rail and the device's volatile memory might only require a 1.5 V power rail. Hence the highest power rail required during sleep mode might only be 1.5 V. Therefore during sleep mode, the minimum $V_{SYS}$ might only be 1.5 V plus possibly some value (e.g. 150 mV) to account for a voltage drop across transistor(s) inside a voltage regulating Low-Drop Out (LDO) regulator of the device. (Such an LDO would be at the interface of the $V_{SYS}$ node and $V_{CC}$ of one or more circuitries within the electronic system 114).

On the other hand in a different mode of operation, the example device's RF module might need to be powered. In this second mode of operation the device's microprocessor might require a 1.7 V power rail, the volatile memory might still require a 1.5 V power rail, but the RF module might require a 2.8 V power rail. Therefore assuming the RF module requires the highest power rail, the minimum $V_{SYS}$ during the second mode of operation might be 2.8 V plus the previously mentioned additional value to account for the transistor voltage drop.

It will be understood that the ICs of the illustrated example embodiments both have the characteristic of stepping down voltage. For this and other reasons understood by those skilled in the art, it would be practical, in a number of circumstances, to combine the functionality of the IC 212 and the functionality of the IC 220 within a single IC, thereby reducing the number of needed ICs by one.

Figure 4:
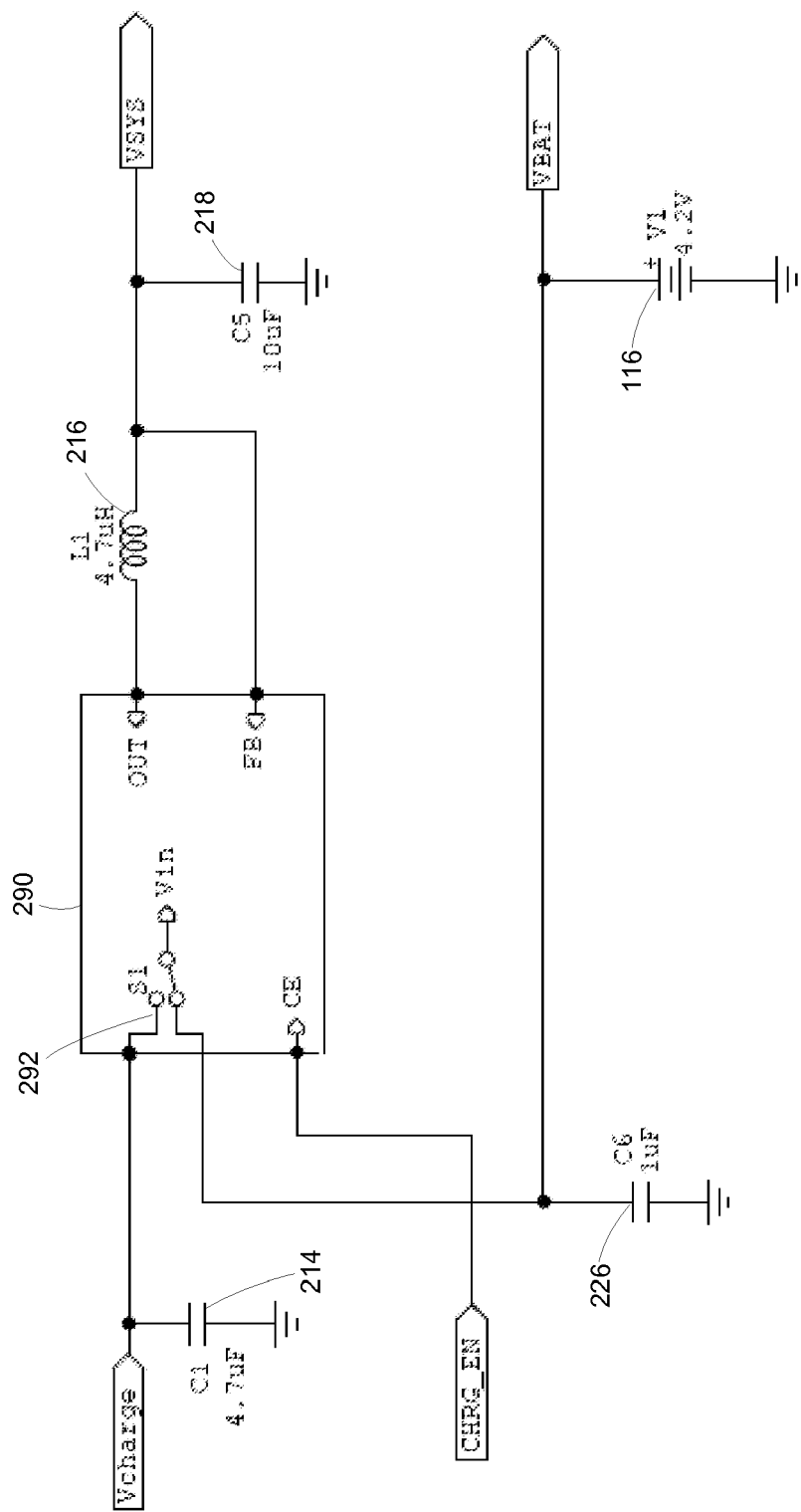
FIG. 4 is a circuit schematic representation of a charging and power supply circuit architecture similar to the architecture of FIG. 2, but with most of the circuitry contained within a single integrated circuit chip.

FIG. 4 illustrates this possibility. Illustrated example IC 290 would provide a solution similar to the solution provided by the example circuit 112, except although the entire battery isolation circuitry is implemented within the IC 290, certain components of the circuit 112 (in particular the capacitors 214, 218, 226 and the inductor 216) are not contained in this particular IC. Also, a switch element 292 within the IC 290 replaces the FET 236 and the resistor 234.

In some examples of ICs similar to the IC 290, multiple OUT pins in electrical communication with the electronic system 114 are provided. In such examples, which of the OUT pins will deliver power to the electronic system 114 depends on what voltage (at most) is required on the system's power rail(s) at a particular instance in time. This may depend on the current mode of operation (for example, sleep or normal) of the electronic system 114.

Certain adaptations and modifications of the described embodiments can be made. Therefore, the above discussed embodiments are considered to be illustrative and not restrictive.

What is claimed is:

1. A power management method for allocating power between a rechargeable battery and an electronic system, said electronic system having a power input and a plurality of modes of operation, the method comprising:
   generating output power;
   receiving a reference voltage from said electronic system;
   determining, based on said reference voltage, a minimum voltage value needed at a node directly connected to said power input of said electronic system;
   sensing that a voltage at said node is below said minimum voltage value; and
   restricting, responsive to said sensing, current from said output power to said battery, thereby increasing power allocated to said electronic system.

2. The method of claim 1 wherein said generating comprises deriving said output power from an external power source in a manner such that said output power has a higher current and a lower voltage than power provided by said external power source.

3. A USB-compliant charging and power supply circuit comprising:
  switch-mode battery charging circuitry adapted to:
    receive external power from an external power source; and
    supply output power, through an output node, to:
      an electronic system of an electronic communication device; and
      a battery, via a switch;
  said switch-mode battery charging circuitry having an integrated circuit and an inductor, said integrated circuit arranged to cooperate with said inductor to supply said output power with a current of greater magnitude than current of said external power;
  battery isolation circuitry adapted to:
    receive a reference voltage from said electronic system;
    determine, based on said reference voltage, a minimum voltage value needed at said output node;
    sense that a voltage at said output node is below said minimum voltage value; and
    control, responsive to said sensing, said switch to restrict current of said output power to said battery, thereby increasing a power allocated to said electronic system.

4. The USB-compliant charging and power supply circuit of claim 3 wherein said switch-mode battery charging circuitry includes switch-mode power supply circuitry adapted to:
  receive battery power from said battery;
  convert said battery power to converted power; and
  supply said converted power to said electronic system through said inductor and said output node.

5. The USB-compliant charging and power supply circuit of claim 3 wherein said voltage at said output node is fed back to said integrated circuit and in response, said integrated circuit is arranged to adjust said voltage value at said output node.

6. The USB-compliant charging and power supply circuit of claim 3 further comprising a switch-mode DC-DC converter integrated circuit adapted to:
  receive battery power from said battery;
  convert said battery power to converted power; and
  supply said converted power to said inductor.

7. The USB-compliant charging and power supply circuit of claim 3 wherein said switch-mode battery charging circuitry includes switch-mode power supply circuitry adapted to:
  receive battery power from said battery;
  convert said battery power to converted power; and
  supply said converted power to said electronic system through said output node.

8. An electronic communication device electrically connectable to an external power source, said device comprising:
  a device housing;
  a rechargeable battery contained within said housing;
  an electronic system contained within said housing; and
  a charging and power supply circuit contained within said housing, said charging and power supply circuit including:
    switch-mode battery charging circuitry adapted to:
      receive power from an external power source; and
      supply output power, through an output node, to:
        said electronic system; and
        said rechargeable battery, via a switch;
    said switch-mode battery charging circuitry having an integrated circuit and an inductor, said integrated circuit arranged to cooperate with said inductor to supply said output power with a current of greater magnitude than current of said power received from said external power source;
    battery isolation circuitry adapted to:
      receive a reference voltage from said electronic system;
      determine, based on said reference voltage, a minimum voltage value needed at said output node;
      sense that a voltage at said output node is below said minimum voltage value; and
      control, responsive to said sensing, said switch to restrict current of said output power to said rechargeable battery, thereby increasing power allocated to said electronic system.

9. The electronic communication device of claim 8 wherein said switch-mode battery charging circuitry includes switch-mode power supply circuitry adapted to:
  receive power from said rechargeable battery;
  converting said power from said rechargeable battery to converted power; and
  supply said converted power to said electronic system through said inductor and said output node.

10. The electronic communication device of claim 8 wherein said switch is a semiconductor switch.

11. The electronic communication device of claim 8 further comprising circuitry adapted to:
  determine charging of said rechargeable battery has been disabled; and
  responsive to said determining, turn off said switch.

* * * * *